UNITED STATES PATENT OFFICE.

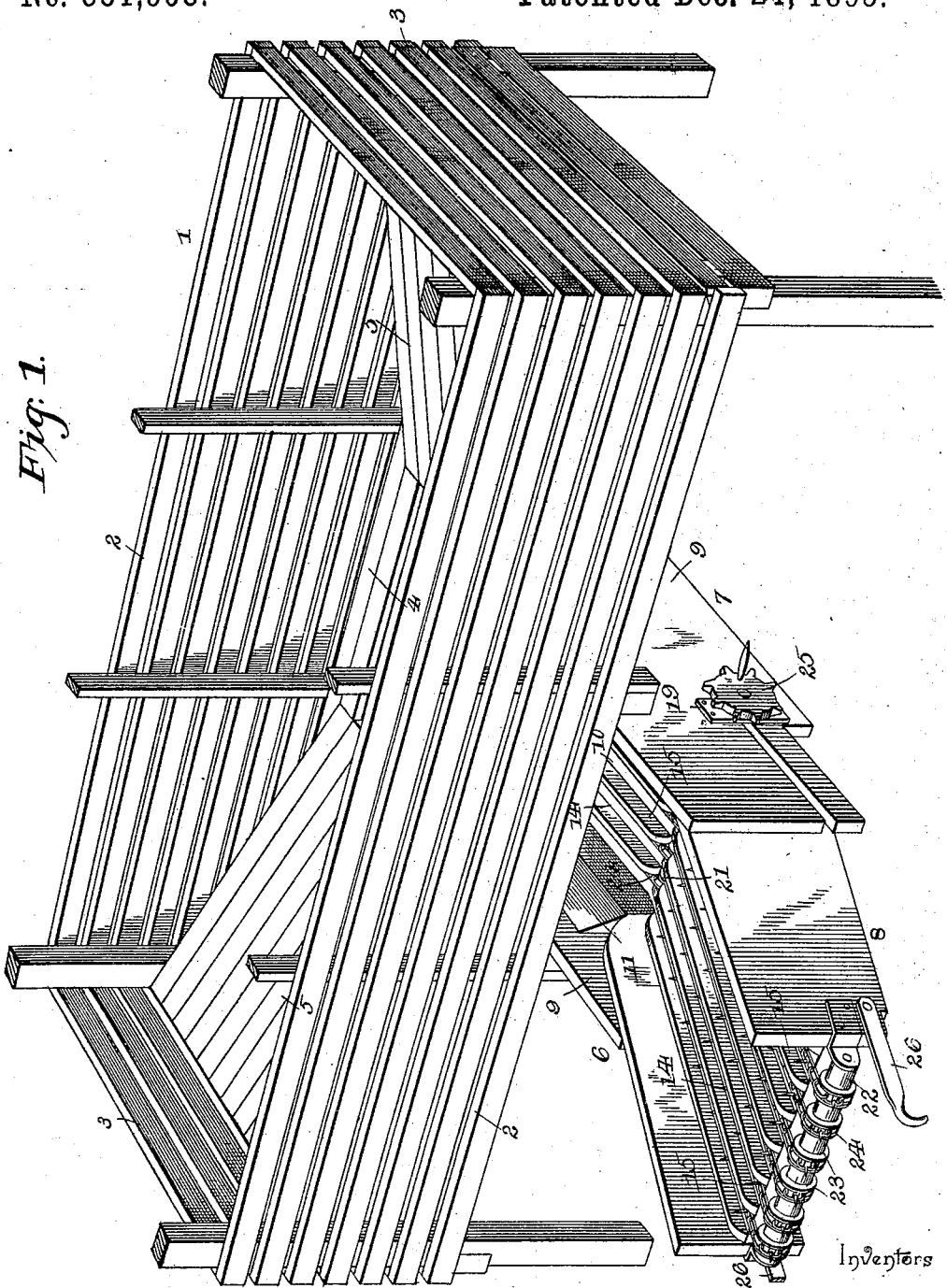

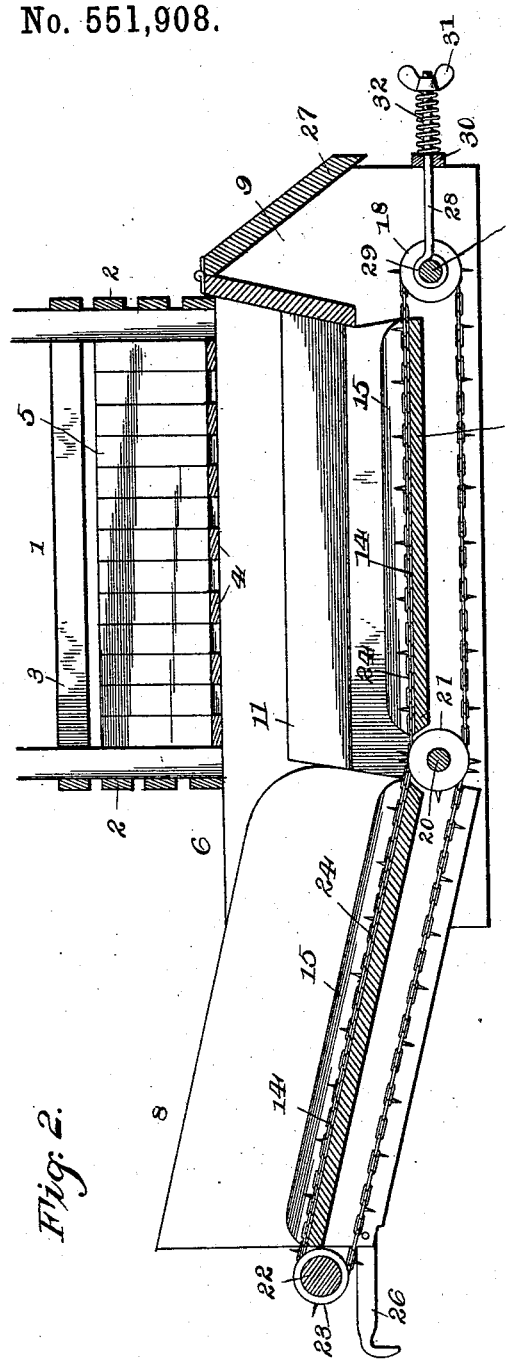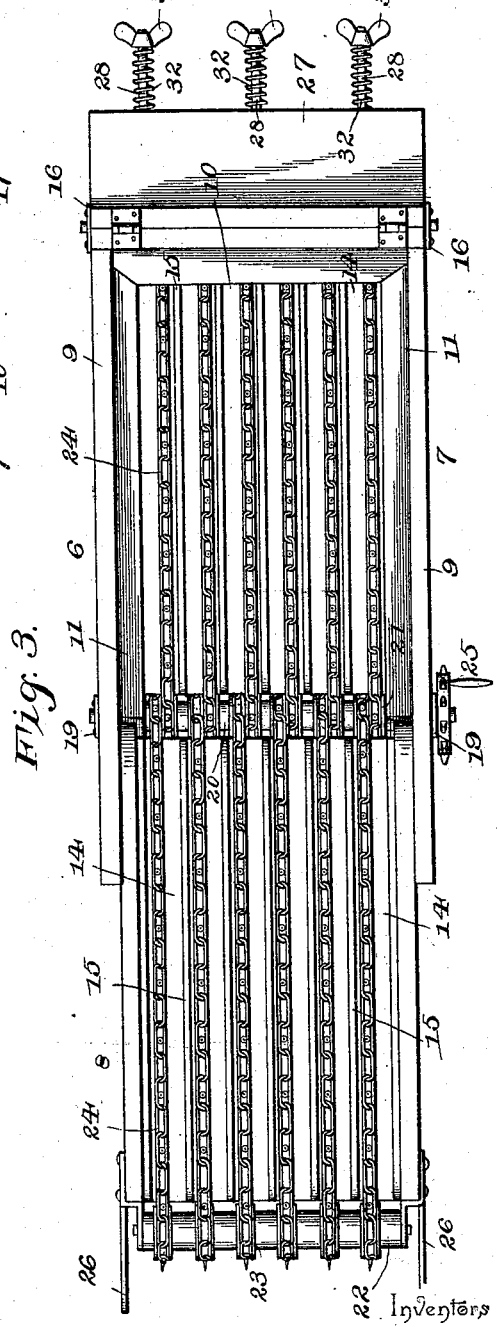

JACOB RADA AND WILHEM WEINER, OF WYMORE, NEBRASKA.

SELF-FEEDING ATTACHMENT FOR CORN-SHELLERS.

SPECIFICATION forming part of Letters Patent No. 551,908, dated December 24, 1895.

Application filed October 31, 1894. Serial No. 527,556. (No model.)

*To all whom it may concern:*

Be it known that we, JACOB RADA and WILHEM WEINER, citizens of the United States, residing at Wymore, in the county of Gage and State of Nebraska, have invented a new and useful Self-Feeding Attachment for Corn-Shellers, of which the following is a specification.

Our invention relates to a self-feeding attachment for corn-shellers and similar machines, and it has for its object to provide a simple and efficient device adapted to receive the corn from the crib and convey it to the hopper or receiving-opening of the machine.

Further objects and advantages of the invention will appear in the following description, and the novel features thereof will be particularly pointed out in the claim.

In the drawings, Figure 1 is a perspective view of a device embodying our invention. Fig. 2 is a longitudinal section of the same. Fig. 3 is a plan view of the feeder proper.

Similar numerals of reference designate corresponding parts in all the figures of the drawings.

1 designates a crib having the slatted side walls 2 and end walls 3, the bottom of the crib having a central horizontal slatted portion 4, and the adjacent inwardly and downwardly inclined portions 5, whereby the ears of corn are directed toward the central slatted portion to pass between the slats and fall into the subjacent feeder 6. The feeder is arranged transversely with relation to the crib, and the horizontal portion 7 thereof is disposed under the horizontal slatted portion of the crib, while the inclined portion 8 may be of any desired length and communicates with a corn-shelling or other machine. (Not shown.)

The parallel side walls 9 of the horizontal or main portion of the frame of the feeder are provided adjacent to the floor 10 with beveled deflecting blocks or strips 11, whereby the ears are thrown inward toward the central portion of the bottom. This central portion of the bottom is provided with a series of longitudinal parallel grooves or ways 13, and the inclined portion 8 is provided in its floor with similar longitudinal parallel grooves or ways 14. These grooves or ways may be and preferably are formed by means of parallel strips or ribs 15.

Mounted in suitable bearings 16 at one end of the main portion of the feeder-frame and beyond the grooved floor thereof is a horizontal spindle 17, carrying a series of pulleys 18, and mounted in similar bearings 19 at the junction of the inclined and main portions of the feeder-frame is a similar spindle 20, carrying pulleys 21. Mounted in bearings at the upper or outlet end of the inclined portion of the feeder-frame is a horizontal spindle 22, carrying pulleys 23, and arranged in the grooves of the main and inclined portions of the feeder and traversing said pulleys are the spurred carrier-chains 24. The shaft 19, which is arranged at the junction of the main and inclined portions of the feeder-frame, may be provided, as shown in the drawings, with a chain or crank wheel 25, whereby power may be communicated to operate the carrier-chains. It will be seen also that this driving-shaft is provided with a double series of chain-pulleys to accommodate the chains of the main and also those of the inclined portions of the feeder.

Pivotally connected to the inclined portion of the feeder-frame at its outlet end are hooks or grappling-arms 26 for engagement with the frame of a corn-shelling or other machine, and arranged at the remote end of the main portion of the feeder and covering the spindle 17 with its chain-pulleys is a hinged flap-door 27.

The operation of the above-described device, briefly stated, is as follows: The corn, which is arranged in the crib, is fed by the inclined portions of its floor to the central slatted or slotted portion thereof, and the ears pass through the slots or intervals between the slats and fall into the horizontal or main portion of the feeder. The movement of the spurred chains disposes the ears parallel with the grooves or ways in the feeder-frame, whereby the ears are received by such grooves or ways, and are then carried up the inclined portion of the feeder and are discharged into the machine.

It will be understood that while those ears which are engaged by the teeth of the carrier-chains are mainly turned to positions parallel with said chains and received by the grooves or ways all of the ears will not be so turned, particularly if they are fed into the feeder more rapidly than they can be accommodated in the grooves or ways. In this case some of the ears will be moved forward by contact with those ears which are received in the grooves or ways and may occupy positions transverse to the length of the feeder.

The slats forming the horizontal portion of the crib are preferably removable to provide for their adjustment laterally, or for the entire removal of certain slats to provide greater intervals.

Tension-rods 28 are connected by means of eyes 29 to the spindle 27, and are passed through a transverse bar 30 at the rear end of the frame and engaged by nuts 31. By means of this device the chains may be tightened to compensate for wear, expansion due to change of temperature, &c. Springs 32 are interposed between the nuts and the bar 30 to relieve strains on the chains.

Various changes in the form, proportion and the minor details of construction may be resorted to without departing from the principle or sacrificing any of the advantages of this invention.

Having thus described the invention, what is claimed, and desired to be secured by Letters Patent, is—

A feeder having a horizontal or main portion provided in its floor with a series of parallel longitudinal grooves or ways, a communicating inclined portion the floor of which is provided with similar parallel grooves or ways, a driving shaft mounted transversely at the junction of the horizontal and the inclined portions of the feeder and carrying chain pulleys, spindles mounted transversely at the remote ends of the horizontal and inclined portions of the feeder, and spurred chains carried by the pulleys on the driving shaft and spindles and extending longitudinally through the grooves or ways in the floors, whereby ears of corn deposited in the horizontal portion of the feeder are adjusted by the chains and are caused to fit in and move longitudinally through the grooves or ways, substantially as specified.

In testimony that we claim the foregoing as our own we have hereto affixed our signatures in the presence of two witnesses.

JACOB RADA.
WILHEM WEINER.

Witnesses:
HENRY SCHNIETZ,
R. S. TURNER.